US007610508B2

(12) United States Patent
Ohno et al.

(10) Patent No.: US 7,610,508 B2
(45) Date of Patent: Oct. 27, 2009

(54) STORAGE SYSTEM AND SETTING METHOD FOR STORAGE CONFIGURATION INFORMATION

(75) Inventors: Shotaro Ohno, Yamato (JP); Toshihiro Kawano, Ayase (JP); Takashi Kitayama, Fujisawa (JP); Toshiyuki Haruma, Yokohama (JP); Akinori Ono, Yokohama (JP); Yuichiro Nagashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 12/050,699

(22) Filed: Mar. 18, 2008

(65) Prior Publication Data

US 2008/0307176 A1 Dec. 11, 2008

Related U.S. Application Data

(63) Continuation of application No. 11/606,308, filed on Nov. 27, 2006, now Pat. No. 7,370,229, which is a continuation of application No. 10/783,283, filed on Feb. 20, 2004, now abandoned.

(30) Foreign Application Priority Data

Jul. 24, 2003 (JP) ............................. 2003-278737

(51) Int. Cl.
*G06F 11/00* (2006.01)
(52) U.S. Cl. ............................................. 714/6; 714/7
(58) Field of Classification Search ...................... 714/6, 714/7, 9
See application file for complete search history.

(56) References Cited

U.S. PATENT DOCUMENTS

| 6,058,489 | A | 5/2000 | Schultz et al. |
| 6,880,058 | B2 | 4/2005 | Mizuno et al. |
| 6,883,065 | B1 | 4/2005 | Pittelkow et al. |
| 6,898,727 | B1 | 5/2005 | Wang et al. |
| 7,266,719 | B1 | 9/2007 | LeCrone et al. |
| 7,296,131 | B2 | 11/2007 | Mimatsu et al. |
| 2002/0019923 | A1 | 2/2002 | Reuter et al. |
| 2003/0065902 | A1 | 4/2003 | Shiga et al. |
| 2003/0101317 | A1 | 5/2003 | Mizuno et al. |
| 2004/0083401 | A1 | 4/2004 | Furukawa et al. |
| 2005/0120171 | A1 | 6/2005 | Yasukawa et al. |
| 2007/0038748 | A1 | 2/2007 | Masuyama |

FOREIGN PATENT DOCUMENTS

JP 2002-063063 A 2/2002

*Primary Examiner*—Joshua A Lohn
(74) *Attorney, Agent, or Firm*—Townsend and Townsend and Crew LLP

(57) ABSTRACT

Pairs are formed from a plurality of dispersed volumes and copying between the volumes is conducted by a series of remote operations from a management server. A management server 10 instructs the generation of configuration setting files 23, 30 to host computers 20, 30 selected so as to form copy pairs. If the configuration setting files are generated by host agents 21, 31, the management server 10 instructs copy start to a host computer 20 having a primary volume. The host agent 21 generates a prescribed command via a copy pair control module 22 and causes a storage subsystem 40 to execute copying between the volumes. When copying is completed, the management server 10 acquires the newest storage configuration information from the storage subsystem 40 and updates configuration information DB12.

1 Claim, 15 Drawing Sheets

FIG. 3(a)

| STORAGE CONFIGURATION INFORMATION | | | | | |
|---|---|---|---|---|---|
| DEVICE No. | RAID NAME | HOST NAME | DISK NAME ON HOST | VOLUME TYPE | SYNCHRONIZATION STATE |
| 0:00 | RAID1 | Host1 | Device1 | P-VOL | sync |
| 0:01 | RAID1 | Host2 | Device2 | S-VOL | sync |
| 0:02 | RAID1 | ... | ... | ... | ... |
| 0:03 | RAID1 | Host1<br>Host2 | Device4<br>Device4 | ... | ... |
| ⋮ | ⋮ | ⋮ | ⋮ | ⋮ | ⋮ |

FIG. 3(b)

| DISK MANAGEMENT TABLE | | | | |
|---|---|---|---|---|
| DISK NAME | RAID NUMBER | PORT | DEVICE No. | NOTE |
| Device1 | RAID1 | P3A | 0:00 | P-VOL |
| Device2 | RAID1 | P3A | 0:01 | P-VOL |
| Device3 | RAID1 | P3B | 0:02 | — |
| Device4 | RAID1 | P3B | 0:03 | CMD |

FIG. 3(c)

CONFIG FILE GENERATION INSTRUCTION

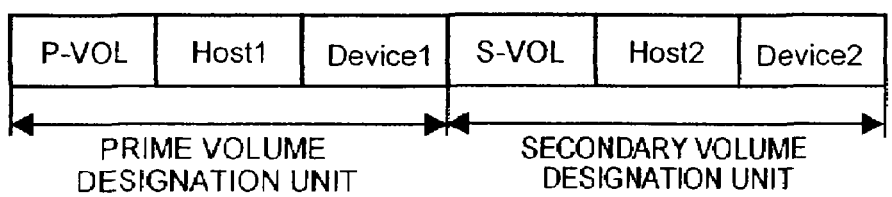

| | HOST NAME | VOLUME TYPE | DEVICE NAME | RAID NAME |
|---|---|---|---|---|
| ☐ | Host1 | P-VOL | Device1 (P-VOL) | RAID1 |
| ☑ | Host2 | NOT SET ▼ | Device2 (S-VOL) | RAID1 |
| ⋮ | ... | P-VOL / S-VOL / NOT SET | ... | ⋮ |

FIG. 11(a)

| SELF HOST NAME | SELF HOST VOLUME | MATE HOST NAME | MATE HOST VOLUME |
|---|---|---|---|
| Host1 | VOL1 P-VOL | Host2 | VOL2 S-BOL |
| Host2 | VOL2 S-VOL | Host1 | VOL1 P-BOL |
| Host2 | VOL3 P-VOL | Host3 | VOL4 S-BOL |
| Host3 | VOL4 S-VOL | Host2 | VOL3 P-BOL |
| : | : | : | : |

FIG. 11(b)

COUNT OF APPEARANCE FREQUENCY

FIG. 11(c)

| HOST NAME | APPEARANCE FREQUENCY |
|---|---|
| Host1 | 2 TIMES |
| Host2 | 4 TIMES |
| Host3 | 2 TIMES |

⇐ HOST WITH MOST FREQUENT APPEARANCE

FIG. 11(d)

Host2 IS CATALOGUED AS COMMAND ISSUANCE DESTINATION

FIG. 11(e)

REMOVAL OF PAIRS INCLUDING THE HOST CATALOGUED AS COMMAND ISSUANCE DESTINATION

| SELF-HOST NAME | SELF-HOST VOLUME | MATE-HOST NAME | MATE-HOST VOLUME |
|---|---|---|---|
| ~~HOST1~~ | ~~VOL1 P-VOL~~ | ~~HOST2~~ | ~~VOL2 S-BOL~~ |
| ~~HOST2~~ | ~~VOL2 S-VOL~~ | ~~HOST1~~ | ~~VOL1 P-BOL~~ |
| ~~HOST2~~ | ~~VOL3 P-VOL~~ | ~~HOST3~~ | ~~VOL4 S-BOL~~ |
| ~~HOST3~~ | ~~VOL4 S-VOL~~ | ~~HOST2~~ | ~~VOL3 P-VOL~~ |
| : | : | : | : |

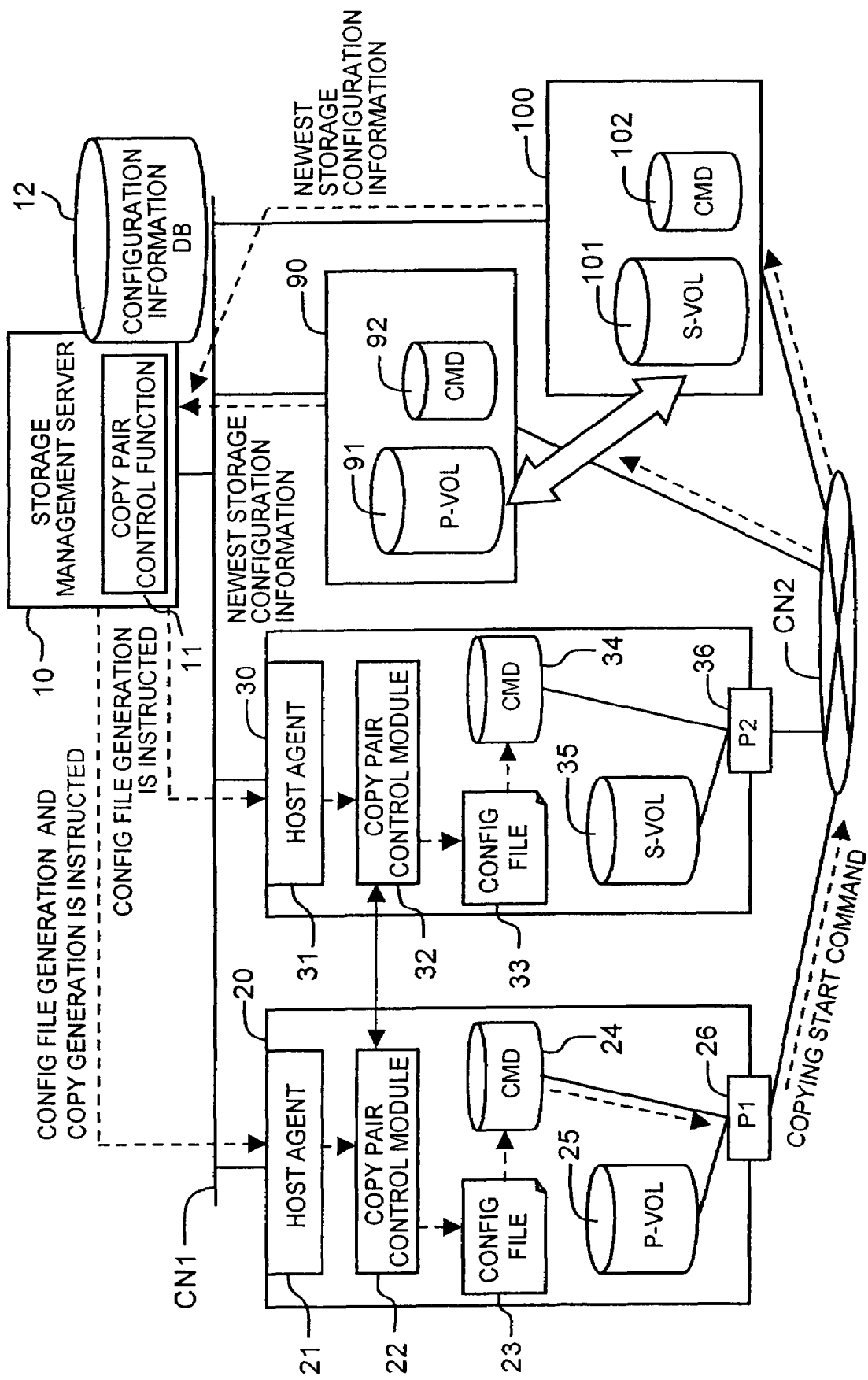

STORAGE SYSTEM AND SETTING METHOD FOR STORAGE CONFIGURATION INFORMATION

CROSS-REFERENCE TO RELATED APPLICATIONS

This application relates to and claims priority from Japanese Patent Application No. 2003-278737 filed on Jul. 24, 2003, the entire disclosure of which is incorporated herein by reference.

BACKGROUND OF THE INVENTION

1. Field of the Invention

The present invention relates to a storage system in which, for example, a storage device such as a disk array subsystem and a host computer are connected via a communication network and to a setting method for storage configuration information.

2. Description of the Related Art

In database systems handling large-scale data, such as data center, data are managed by using storage subsystems such as disk array devices. Because the disk array devices are configured by arranging a multiplicity of disks in an array-like pattern, they are created based on, for example, RAID (Redundant Array of Independent Inexpensive Disks). In disk array devices, a logical volume which is a logical storage area can be created on a physical disk and the logical volume is provided to host computers such as application servers. The host computers and disk array devices are connected to each other via a device-sharing communication environment such as a SAN (Storage Area Network). Each host computer constituting part of the SAN can read and write the data by accessing the logical volume that has been allocated thereto (or access-authorized) among the logical volumes that the disk array devices have.

A technology is also known in which a management server is provided in the SAN, the management server and each host computer or storage device are connected by a LAN (Local Area Network), and an integrated control is conducted (Japanese Patent Application Laid-open No. 2002-63063).

When data back-up is created, for example, by copying data stored in a certain volume to another volume, a pair of a primary volume and a secondary volume is set and data copying is executed by selecting an appropriate timing. It is, thus, sometimes necessary to change the configuration of a storage system in response to occasional request, but even if a management server has been provided, setting or changing the storage configuration information via a network is a difficult and time-consuming operation. For example, when a storage manager changes the configuration of the storage system, the configuration changes have to be posted by appropriate means such as a telephone or e-mail to the managers of host computers sharing the storage. Furthermore, because the configuration information stored by the host computers also has to be appropriately changed according to configuration changes of the storage system, a manager is required for carrying out respective managing operations for each host computer. Therefore, when storage configuration information is to be set or changed, the storage manager has to communicate with each manager of all the participating host computers and the managers of all the host computers have to carry out the respective operations. As a result, setting and changing the storage configuration information is a difficult and time-consuming operation.

SUMMARY OF THE INVENTION

One embodiment of the present invention is directed to provide a storage system and a setting method for storage configuration information that can set the storage configuration information smoothly.

Another embodiment of the present invention is directed to provide a storage system and a setting method for storage configuration information that provide for easy centralized management of copy pair volumes dispersed on a network by conducting a series of operations from a management computer.

One embodiment of the present invention provides a storage system comprising at least one host computer, at least one storage device for providing a memory device to the host computer, and a management computer for managing the storage device, wherein the management computer comprises means for acquiring in advance from the host computer storage configuration information that the host computer has and change notification means for generating change information for changing the storage configuration information that was acquired in advance and posting it to the host computer, and the host computer comprises means for instructing a change of configuration to the storage device based on the change information posted from the management computer.

Here, the host computer is a computer device using the storage device. Examples thereof include personal computers, workstations, mainframes, and the like. The storage device comprises at least one (usually a multiplicity of) physical memory device such as a hard disk, a semiconductor memory, and an optical disk, sets virtual storage areas (logical volumes) on physical storage areas and provides them to the host computers. The storage configuration information as referred to herein is the information indicating the usage status of the storage device, for example, indicating which memory device is used by which host computer.

When the configuration of the storage system is to be changed, the management computer acquires in advance the storage configuration information held by the host computers. This storage configuration information indicates the configuration prior to changes. The management computer then generates change information for changing the storage configuration information based on the configuration which is to be further obtained by changes and posts the generated change information to the host computers. The host computers that received the change information instruct configuration changes to the storage devices. Thus, communication between the managers and manual operations are eliminated and the configuration of storage devices can be changed via the host computers based on the instruction from the management computer.

In one embodiment of the present invention, the change information comprises first change information for preparing configuration changes of the storage device and second change information for executing the configuration changes prepared by the first change information, the change notification means comprises first notification means for posting the first change information to the host computer and second notification means for posting the second change information to the host computer, the host computer comprises preparation means for preparing the configuration change to the storage device by generating configuration setting information based on the first change information, and execution instruction means for instructing the configuration change to the storage device based on the second change information and the generated configuration setting information.

A prior-phase (preparatory phase) in which configuration changes are prepared and an after-phase (executive phase) in which the prepared configuration changes are executed can be separated by instructing configuration changes in a plurality of phases of the first change information for instructing the preparation of configuration changes (may be also called the configuration change preparation instruction information) and the second change information for executing the prepared configuration changes (may be also called the execution instruction information). Therefore, when necessary, the execution periods of the preparatory phase and executive phase can be shifted or the phases can be executed almost simultaneously and the storage configuration can be set or changed with greater flexibility.

In one embodiment of the present invention, the host computer is provided in a plurality, the first notification means posts the first change information to each host computer, the second notification means post the second change information to a prescribed host computer among the host computers, each host computer comprises preparation means for preparing the configuration change to the storage device by generating configuration setting information based on the first change information, and the prescribed host computer comprises execution instruction means for instructing the configuration change to the storage device based on the second change information and the generated configuration setting information.

Thus, when a plurality of host computers are added to the storage system, the first change information can be posted to all the host computers that participate in configuration changes of the storage devices, and the second change information can be posted only to at least one prescribed computer selected among the host computers to which the first change information was posted, rather than posting the first change information and the second change information in the same way to each host computer. The storage configuration can be set or changed more smoothly by changing the instruction contents which is to be posted, according to the role of each host computer. For example, in the case of copying the logical volumes, a host computer having a primary volume is appropriate as the prescribed host computer to which the second change information is to be posted.

In one embodiment of the present invention, the management computer comprises setting means for setting all or some of the parameters for generating the change information based on the storage configuration information that was acquired in advance.

Examples of parameters for generating the change information include information for setting a logical volume of copy source (primary volume), a host computer that can access the copy source logical volume, a logical volume of copy destination (secondary volume), and a host computer that can access the copy destination logical volume. Making it possible to set all or some of the necessary parameters with setting means allows the change information to be generated and posted to the host computer in an easy manner.

In one embodiment of the present invention, the storage configuration relating to all or some of the parameters set with the setting means is protected.

Protecting the storage configuration relating to all or some of the parameters means that the storage configuration associated with the change information is protected before the change information is posted to the host computer and the configuration of the storage device is changed. For example, such a protection includes the case of logical protection aimed at preventing the logical volume set as a copy source from being deleted. As a result, the preceding configuration serving as a basis for change information can be prevented from being changed without permission prior to posting the change information.

In one embodiment of the present invention, the management computer acquires the newest storage configuration information from the storage device when the configuration of the storage device is changed based on the change information.

As a result, the management computer can verify as to whether the configuration of the storage device was changed correctly based on the change information.

In one embodiment of the present invention, the management computer posts the configuration change of the storage device to another host computer which is not a notification object of the change information but is associated with the configuration change of the storage device.

If a host computer which is actively associated such as a host computer having a primary volume or a host computer having a secondary volume is present as a host computer associated with configuration changes of storage devices, then a host computer which is passively associated, so as not to exceed mere reference to the data of volumes, is also present. Therefore, the contents posted from the management computer is controlled according to the association degree with respect to the configuration changes of the storage devices. The convenience is improved by also posting the configuration changes of the storage device to the passively associated host computer.

According to yet another embodiment of the present invention, there is provided a setting method for storage configuration information, which uses at least one host computer, at least one storage device for providing a memory device to the host computer, and a management computer for managing the storage device, wherein the management computer acquires configuration information of the storage device that is provided to the host computer, generates change information for changing the acquired storage configuration information and posts the generated change information to the host computer, and the host computer instructs a change of configuration to the storage device based on the change information posted from the management computer.

According to yet another embodiment of the present invention, a program for controlling a management computer connected via a communication network to at least one host computer and at least one storage device for providing a memory device to the host computer realizes a function of acquiring in advance from the host computer storage configuration information that the host computer has, a function of generating change information for changing the storage configuration information that was acquired in advance and posting it to the host computer, and a function of acquiring the newest storage configuration information from the storage device when the configuration of the storage device is changed by the host computer instructing the configuration change to the storage device based on the posted change information.

According to yet another embodiment of the present invention, a program for controlling a host computer connected via a communication network to a storage device and a management computer for managing the storage device, realizes a function of transmitting its own storage configuration information to the management computer, a function of receiving from the management computer change information for changing the transmitted storage configuration information, and a function of instructing a change of configuration to the storage device based on the received change information.

The storage system according to yet another embodiment of the present invention comprises a plurality of host computers, at least one storage device for respectively providing a volume to each host computer, and a management computer for managing the storage device, wherein the management computer comprises prior acquisition means for acquiring in advance from each host computer the volume information that each host computer has, selection means for respectively selecting pairs of primary volumes and secondary volumes based on the acquired volume information, first instruction means for instructing the generation of configuration setting information following the selected contents to a host computer having the selected volume as the primary volume and a host computer having the selected volume as the secondary volume, and second instruction means for instructing a volume copy to any one of the selected host computers, wherein at least each of the selected host computers comprises means for generating configuration setting information following the selected contents based on the instruction from the first instruction means, and means for instructing the volume copy to the storage device based on the instruction from the second instruction means.

Further, the management computer can comprise detection means for detecting, when host computers of a plurality of sets are selected by the selection means, a host computer which takes part in both sides of a plurality of sets, and the second instruction means instructs to the detected host computer a volume copy that relates to a set in which the host computer takes part.

Thus, when a plurality of copy pair volumes are set, the volume copy execution instruction from the second instruction means can be posted to all the host computers having primary volumes of each pair or can be posted only to common host computers taking part in the plurality of pairs.

The above-mentioned and other embodiments of the present invention will become more apparent by the following description.

BRIEF DESCRIPTION OF THE DRAWINGS

FIG. 3(a) shows the data structure of storage configuration information; FIG. 3(b) shows the data structure of a disk management table; and FIG. 3(c) shows the data structure of a configuration setting file generation instruction command;

FIG. 5 illustrates a screen configuration of a volume summary screen for selecting the volume and host computer for forming a copy pair.

FIG. 11 is an explanatory drawing showing a typical process for determining the command issuance destination;

FIG. 12 is a block diagram showing the outline of the entire storage system of the third embodiment of the present invention;

DESCRIPTION OF THE PREFERRED EMBODIMENTS

The embodiments of the present invention will be described hereinbelow with reference to the appended drawings.

First Embodiment

Figure 1:
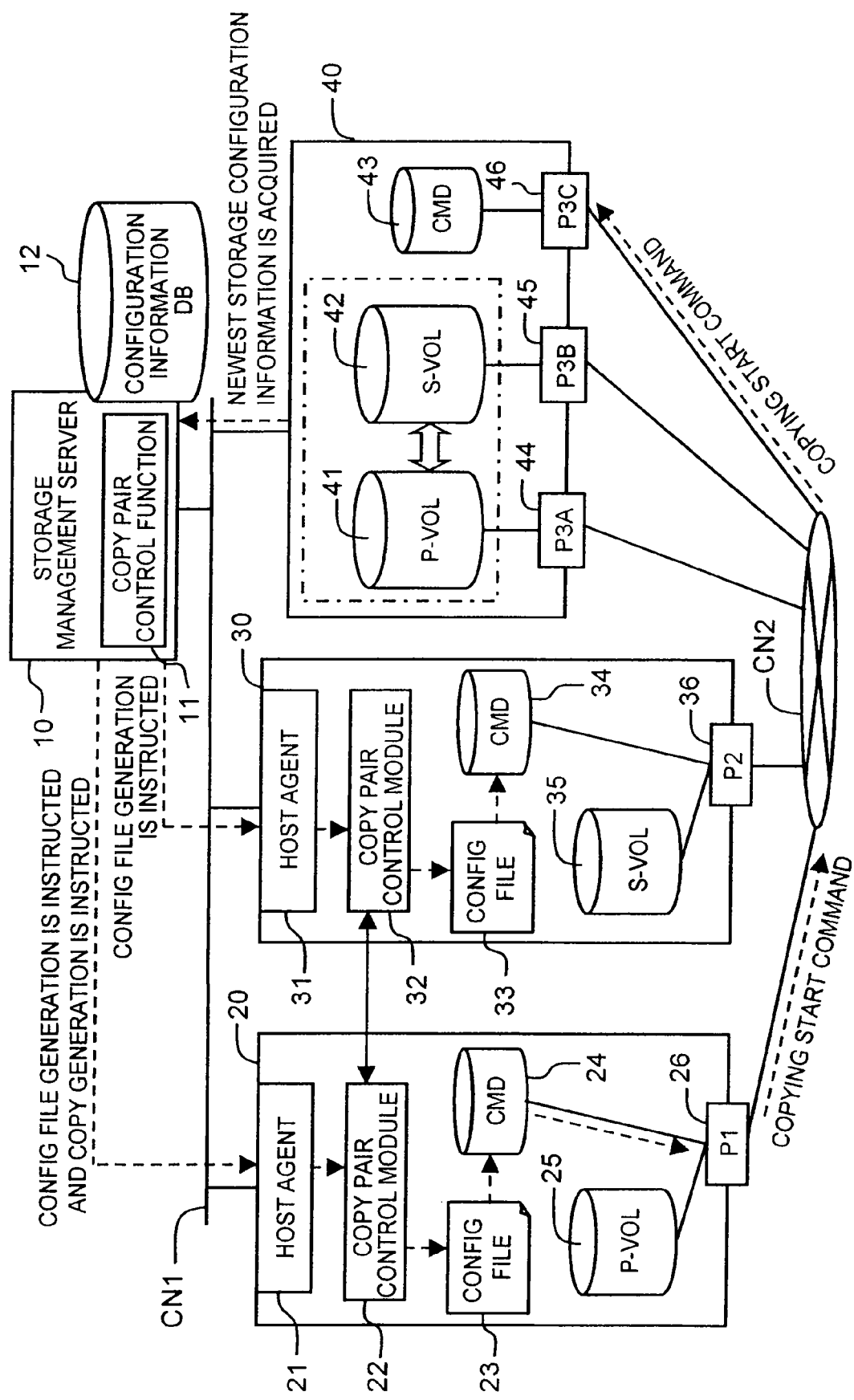
FIG. 1 is a block diagram showing the outline of the entire storage system of the first embodiment of the present invention.

The first embodiment of the present invention will be described below based on FIGS. 1 through 7. FIG. 1 is a block diagram showing the outline of the entire storage system of the present embodiment.

The storage system comprises a storage management server 10, a plurality of host computers 20, 30, a storage subsystem 40, and a first communication network CN1 and a second communication network CN2 for connecting those devices, each of the aforesaid components being described hereinbelow.

The storage management server (abbreviated hereinbelow as "a management server") 10 serves for managing the storage subsystem 40. The management server 10 comprises a copy pair control function 11 and a configuration information database (abbreviated hereinbelow as DB) 12. The management server 10 instructs the generation of a configuration setting file (shown as a "config file" in the figures) to the host computers 20, 30 and instructs the host computer 20, in which the primary volume is set, to start copying when the configuration of the storage subsystem 40 is changed (this will be described in greater detail hereinbelow with reference to FIG. 2). If the configuration of the storage subsystem 40 is changed by the host computer 20, the management server 10 acquires and holds the newest state of the storage subsystem 40. Thus, the management server 10 carries out the integrated management of storage configuration of the storage subsystem and conducts remote setting and modification of storage configuration.

The first host computer 20 can be configured as an application server, for example, of a computer device such as a personal computer, a workstation, or a mainframe. The host computer 20 comprises an information input device (not shown in the figures) such as a keyboard switch, a pointing device, and a microphone, and an information output device (not shown in the figures) such as a monitor display and speakers. The host computer 20 comprises a host agent 21, a copy pair control module 22, a configuration setting file 23, a control device (abbreviated as CMD in the figures) 24, a primary volume 25, and a port 26.

The host agent 21 is a program module for generating the configuration setting file 23 based on the instruction received from the management server 10 or for instructing the execution of a copy command to the copy pair control module 22 (this will be described in greater detail hereinbelow with reference to FIG. 2). The copy pair control module 22 is a program module responsible for conducting the control for matching (synchronizing) the storage contents of the volumes constituting a pair. The host agent 21 and copy pair control module 22 demonstrate the respective functions by appropriately using a variety of computer resources (microprocessor, memory, input/output circuit, and the like) of the host computer 20. Parts of the host agent 21 and copy pair control module 22 can be composed of hardware circuits.

The configuration setting file 23 describes the structure of storage resources of the host computer 20. Thus, the configuration setting file 23 stores the information relating to where the entity of the primary volume 25 is located and which of the volumes of the host computer constitute a pair. The control device 24 serves for controlling the storage subsystem 40. The copy pair control module 22 requests the storage subsystem 40 to execute a command via the control device 24. The primary volume 25 is provided from the storage subsystem 40 and is configured by the allocation of volumes 41 located in the storage subsystem 40. Thus, the primary volume 25 of the host computer 20 is virtually present, and the entity thereof is present in the storage subsystem 40. The port 26 conducts transmission and reception of data and commands by using a communication network CN2 which is configured, for example, as a SAN. For example, the port 26 can be configured as a fiber channel HBA (Host Bus Adapter).

Similarly to the first host computer 20, the second host computer 30 also comprises a host agent 31, a copy pair control module 32, a configuration setting file 33, a control device 34, a secondary volume 35, and a port 36. Because the configuration of those components is identical to that of the respective components of the first host computer 20, the explanation thereof is omitted. The second host computer 30 is used as a backup server for backing up the data of the first host computer 20 and has a secondary volume 35 allocated from the storage subsystem 40.

The storage subsystem 40 is configured, for example, as a disk array device based on RAID and comprises a primary volume 41, a secondary volume 42, and a control device 43. The storage subsystem 40 has a multiplicity of physical disk drives, and the physical storage areas provided by those disk drives are organized in logical storage areas (logical volume (Logical Unit)) by slicing or striping, the specifics of this procedure being described hereinbelow. The storage subsystem 40 provides respective logical volumes 41, 42 to the host computers 20, 30. For example, the host computers 20, 30 can have access only to the auto-allocated volume (41 or 42), for example, by zoning or LUN (Logical Unit Number) masking. The control device 43 is shared by the host computers 20, 30. The ports 44 to 46 are the communication ports for accessing respective volumes 41 to 43 via the communication network CN2 and are configured as fiber channel adapters.

The first communication network CN1 is configured, for example, as a special LAN for management, and the second communication network CN2 is configured, for example, as a SAN. The first communication network CN1 communicably connects the management server 10, host computers 20, 30, and storage subsystem 40. The first communication network CN1 transfers various commands and management data between the management server 10, host computers 20, 30, and storage subsystem 40. The second communication network CN2 communicably connects the host computers 20, 30 and storage subsystem 40, and transfers data and commands between those host computers 20, 30 and storage subsystem 40.

Figure 2:
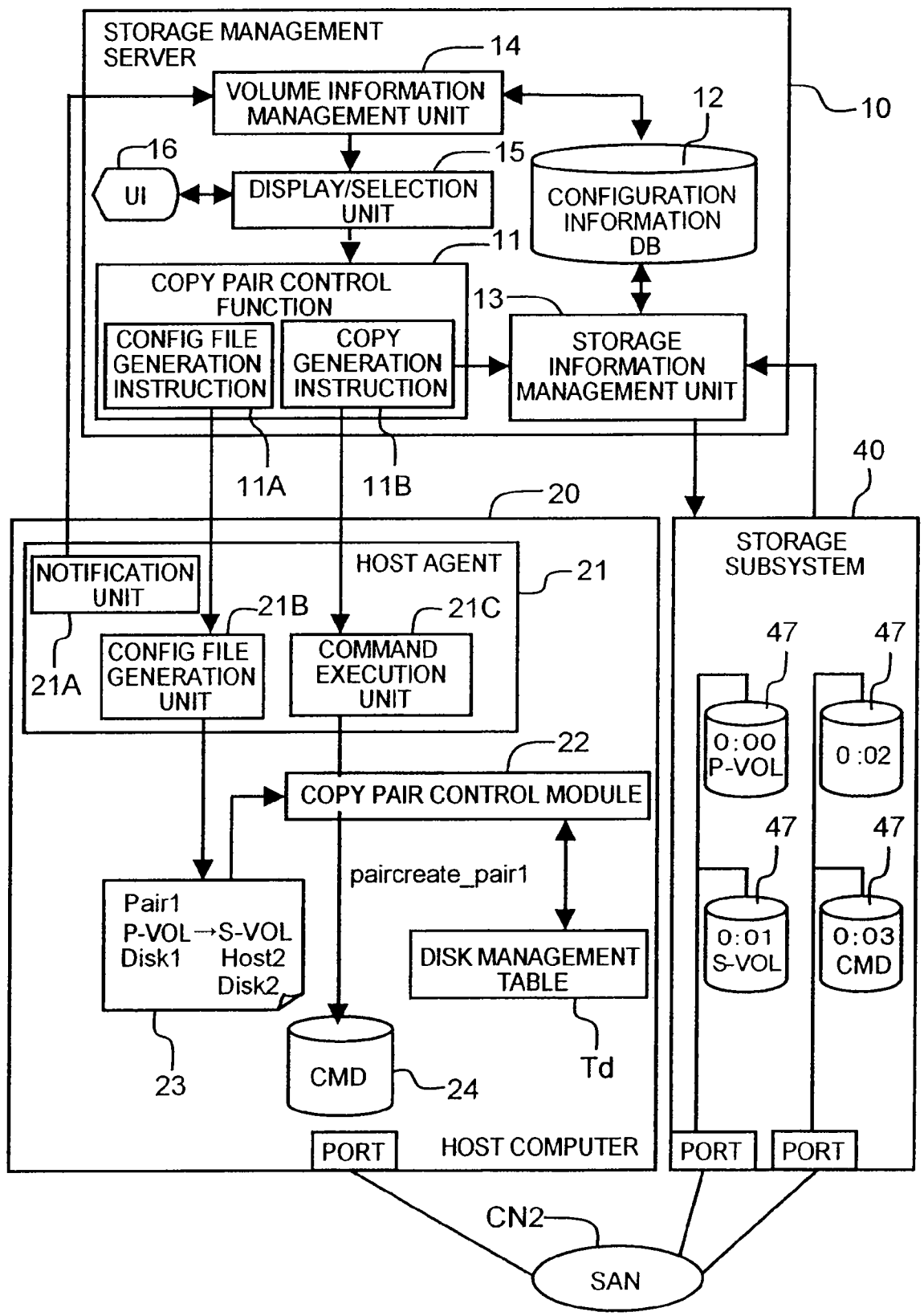
FIG. 2 is a block diagram illustrating in detail the main part of the structure shown in FIG. 1.

FIG. 2 is a block diagram illustrating the main part of the structure shown in FIG. 1. Thus, FIG. 2 shows the management server 10, the first host computer 20, and the storage subsystem 40. First, the detailed structure of the management server 10 will be described. The management server 10, in addition to the copy pair control function 11 and configuration information DB12, comprises a storage information management unit 13, a volume information management unit 14, a display/selection unit 15, and a user interface (abbreviated as UI in the figure) 16. Furthermore, the copy pair control function 11, for example, configured as software comprises a configuration setting file generation command unit 11A and copy production command unit 11B as internal functions.

The configuration setting file generation command unit 11A instructs the generation of the configuration setting files 23, 33 to the host agents 21, 31 of the host computers 20, 30 based on the storage configuration set by the display/selection unit 15. The copy production command unit 11B instructs the execution of a copy command to the first host computer 20 that will set the primary volume 25.

The storage information management unit 13 acquires the status of the storage subsystem 40 and reflects it in the configuration information DB12. If the storage information management unit 13 recognizes that the configuration of the storage subsystem 40 has been changed via the host computer 20 according to the instruction from the copy pair control function 11, it requests that new storage configuration information be transmitted to the storage subsystem 40 and updates and catalogues the new storage configuration information received from the storage subsystem 40 in the configuration information DB. The volume information management unit 14 acquires the volume information containing the control devices 24, 34 from the host computers 20, 30. The acquired volume information is reflected in the configuration information DB12. The display/selection unit 15 presents a summary of the volumes that can be selected via the UI unit 16 to the storage manager. Furthermore, the display/selection unit 15 instructs the setting of the storage configuration information to the copy pair control function 11 based on the information inputted by the storage manager.

The first host computer 20 will be described below in greater detail. The host agent 21 comprises a notification unit 21A, a configuration setting file generation unit 21B, and a command execution unit 21C. The notification unit 21A conducts communication with the management server 10 via the first communication network CN1. The notification unit 21A transmits the contents of the configuration setting file 23 or the operation completion report to the management server 10, and receives various instructions from the management server 10. The configuration setting file generation unit 21B generates the configuration setting file 23 with the requested specifications in response to the command from the management server 10. A plurality of configuration setting files 23 can be set, but only one file is shown in the figure for the sake of convenience. The command execution unit 21C requests the execution of copy command from the copy pair control module 22 in response to the instruction from the management server 10.

The copy pair control module 22 generates a command such as "paircreate_pair1" based on the instruction from the command execution unit 21C and inputs this command to the control device 24. The copy pair control module 22 refers to a disk management table Td when the copy command is created. The disk management table Td serves to convert the abstracted disk name which is recognized by the OS (Operating System) of the host computer 20 into information that can be actually accessed, as will be described hereinbelow with reference to FIG. 3(b). Further, if a command is inputted from the copy pair control module 22 to the control device 24, then the instruction contents of the command will be transferred to the control device 43 of the storage subsystem 40 via the second communication network CN2 and copying of the volumes constituting the pair will be executed in the storage subsystem 40. Thus, copying between the volumes is the so-called server-free processing which is conducted without the participation of the host computer 20.

The storage subsystem 40 comprises a plurality of logical volumes 47. Each logical volume 47 is a virtual disk device provided to the host computers 20, 30 and is assigned with a device identification information such as "0:00", "0:01", "0:02", and "0:03". One logical volume 47 ("0:01") among the logical volumes 47 is allocated as the primary volume 41 shown in FIG. 1 to the host computer 20. The other logical volume 47 ("0:02") is allocated as a secondary volume 42 shown in FIG. 1 to the host computer 30. Yet another logical volume 47 ("0:03") is used as the control device 43 shown in FIG. 1. The logical volume 47 "0:02" is not used or used in a host computer which is not shown in the figures. The above explanation is merely illustrative and not limiting. For example, the primary volume 41 or secondary volume 42 can be also created from a plurality of logical volumes 47. Further, in FIG. 2 the port configuration is different form that in FIG. 1 in order to show a specific configuration of the storage subsystem 40.

FIG. 3 shows an example of a variety of data structures. FIG. 3(a) shows storage configuration information stored in the configuration information DB12 of the storage subsystem 40. The storage configuration information is configured based on the information acquired from the host computers 20, and storage subsystem 40. The storage configuration information is configured, for example, by mapping a device number (the name of the logical volume 47 which is identified by the device No.) provided by the storage subsystem 40, a RAID name for identifying the storage subsystem 40, a host name where the device has been allocated, a disk name recognized on the host, a volume type indicating the application of the allocated volume, and a synchronization state indicating the matching state of the storage contents. In the example shown in FIG. 3(a), the logical volume 47 of the device No. "0:00" is attributed to the storage subsystem 40 specified by the "RAID1" and is provided as a primary volume to the first host computer 20 specified by the "Host1". Similarly, the logical volume 47 of the device No. "0:01" is attributed to the storage subsystem 40 specified by the "RAID1" and is provided as a secondary volume to the second host computer 30 specified by the "Host2". Further, it is clear that the storage contents of the volumes provided to the host computers 20, 30 were synchronized by "sync" set to the synchronization state. Furthermore, it is clear that the logical volume 47 specified by the device No. of "0:03" attributed to the storage subsystem 40 specified by the "RAID1" is used as a control device and shared by the host computers 20, 30.

FIG. 3(b) illustrates an example of the disk management table Td shown in FIG. 2. The disk management table Td maps, for example, a device name which is the name of the logical volume provided by the storage subsystem 40, a RAID name specifying the storage subsystem 40 to which the devices belong, a port name for accessing the devices, a device number allocated to each device, and a remarks column.

FIG. 3(c) shows an example of the configuration setting file generation instruction provided from the management server 10 to the host computers 20, 30. The information instructing the generation of a new configuration setting file (config file) is configured by including a primary volume designation unit and a secondary volume designation unit. The primary volume designation unit comprises, for example, a host name (Host1) that will set the primary volume (P-VOL) and a device name (Device1) in the storage subsystem 40 used as the primary volume. The secondary volume designation unit comprises, for example, a host name (Host2) that will set the secondary volume (S-VOL) and a device name (Device2) in the storage subsystem 40 used as the secondary volume. Configuration setting file generation instructions of identical contents are posted to the host computers 20, 30 belonging to the same pair. The same contents as referred to herein means that the specific instruction contents are the same. For example, there can be cases in which the header portions describing the address or the like are different. The host agents 21, 31 generate respective configuration setting files 23, 33 based on the configuration setting file generation instruction shown in FIG. 3(c).

Figure 4:
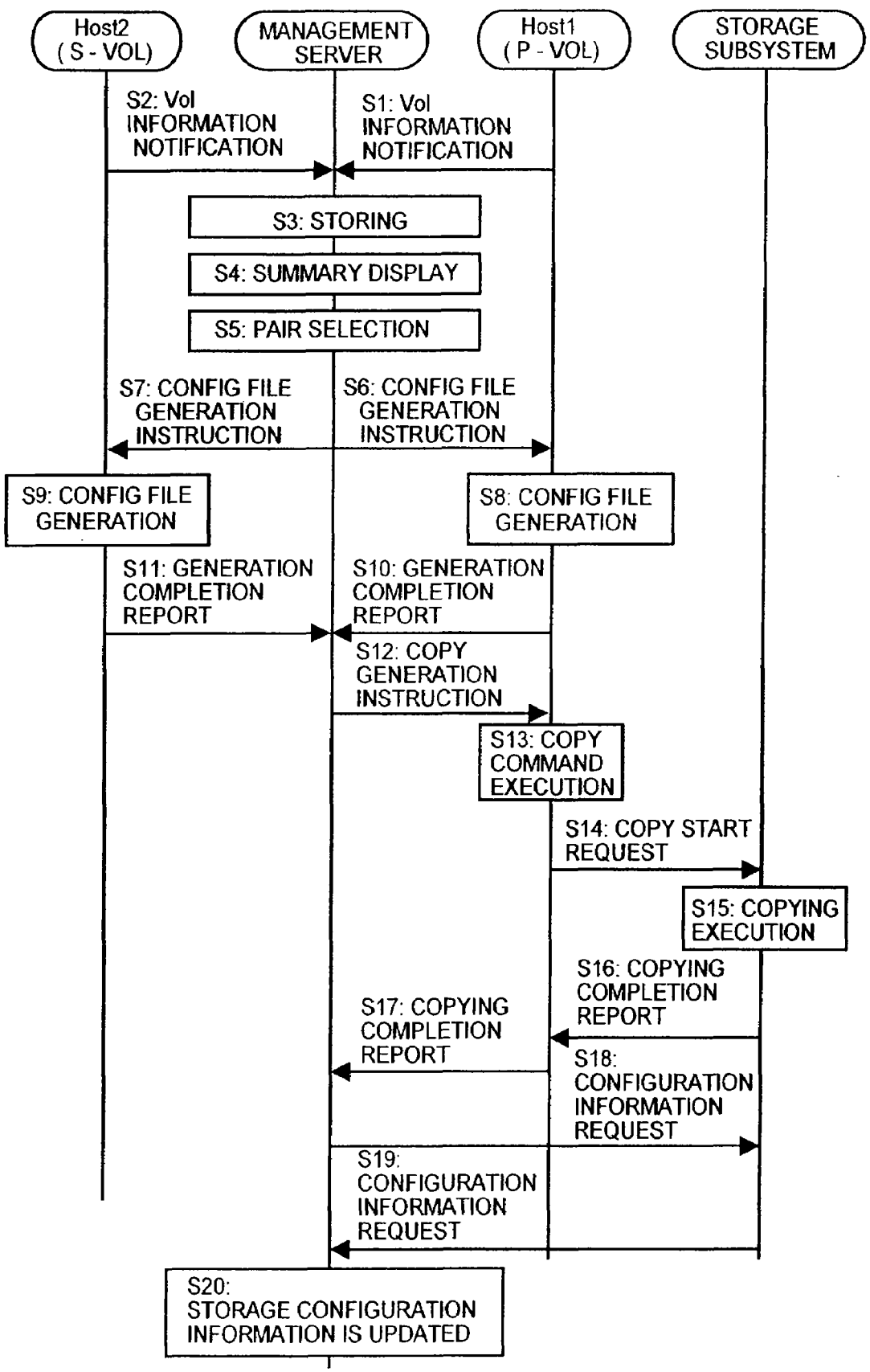
FIG. 4 is a time chart illustrating the outline of the operation of the entire storage system.

The operation of the present embodiment will be described hereinbelow based on FIGS. 4 through 7. FIG. 4 is a time chart illustrating the outline of the operation of the entire storage system. First, the host computers 20, 30 transmit the information on respectively allocated volumes (abbreviated as "Vol") to the management server 10 via a communication network communication network CN (for example, a LAN) (S1, S2). The management server 10 saves the volume information acquired from the host computers 20, 30 in a memory or the like (S3). Then, the management server 10 displays in the UI unit 16 the volume summary for selecting a copy pair based on the saved volume information and the storage configuration information that has been acquired heretofore from the storage subsystem 40 (S4). The storage manager selects a host computer and a volume forming a copy pair based on the volume summary thus displayed (S5).

Here, an example of volume selection screen displayed on the UI unit 16 in S4 will be described with reference to FIG. 5. FIG. 5(a) is a screen example relating to the case in which the volume summary is shown in a tabular format. All the volumes participating in the SAN (or all the volumes that can be selected among the volumes participating in the SAN) are displayed in a summary table G1. For example, a check box G2 for selecting a host computer and a pull-down menu G3 for selecting the volume type can be provided in the summary table G1. The storage manager can select a host computer by marking the check box G2 of the host computer for which the volume setting is desired. Furthermore, the storage manager can instruct the volume type to be set in the selected host computer by selecting the desired volume type from the pull-down menu G3.

Figures 5A, 5B:
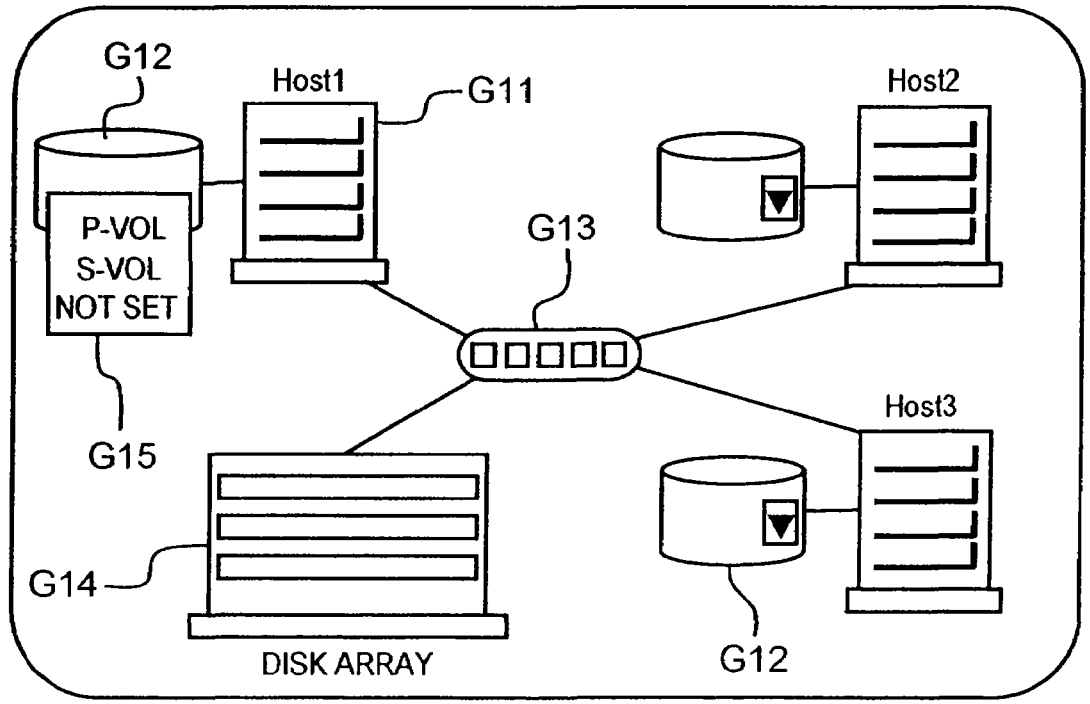
FIG. 5(a) relates to the case in which display is carried out in a tabular format, and FIG. 5(b) relates to the case in which display is carried out graphically.

FIG. 5(b) is a screen example relating to the case in which the volume summary is represented graphically as a network configuration diagram. For example, an icon G11 symbolizing the host computers 20, 30, an icon G12 symbolizing the logical volume connected to the host computer, an icon G13 symbolizing the (fiber channel) switch, and an icon G14 symbolizing the storage subsystem 40 can be displayed on the screen. The storage manager can select the host computer by selecting the desired host computer icon G11 for example, with a pointing device. Furthermore, the storage manager can select the application of the logical volume, for example, by operating the pull-down menu G15 set to the logical volume. The user interface for selecting the logical volume is not limited to that shown in FIG. 5. For example, the desired volume may be also selected by voice input or the like.

Returning to FIG. 4, if one copy pair is selected by the storage manager, that is, if a host computer 20 that will provide the primary volume and a host computer 30 that will provide the secondary volume are selected, then the copy pair control function transmits the configuration setting file generation instruction such as shown in FIG. 3(c) to the selected host computers 20, 30 via the communication network CN1 (S6, S7). The host agents 21, 31 of the host computers 20, 30 that have received the notifications from the management server 10 generate the respective configuration setting files 23, 33 based on the instruction contents (S8, S9) and transmit a report that the configuration setting files 23, 33 have been generated to the management server 10 via the communication network CN1 (S10, S11). The preparation for conducting copying between the volumes forming a pair is completed by the generation of the configuration setting files 23, 33.

If the management server 10 receives the generation completion report relating to the configuration setting files 23, 33, the copy control function 11 instructs the host computer 20 that will provide the primary volume to start volume copying via the communication network CN1 (S12). Here, the copying start command can be posted simultaneously with the instruction to generate the configuration setting files 23, 33 or may be posted with a shift in time with respect to the posting period of the configuration setting file generation instruction. In any case, the instruction is posted by freely selecting the period in which copying between the volumes of the selected host computers 20, 30 can be conducted.

The host agent 21 of the host computer 20 that has received the copy start command (copy command) requests the execution of the copy command via the copy pair control module 22 (S13). As a result, the copy pair control module 22 generates the prescribed command and requests a copy between the volumes of the storage subsystem 40 from the control device 24 via the communication network CN2 (for example, a SAN) (S14). The copy start request contains the information specifying the copy source volume and the information specifying the copy destination volume.

The storage subsystem 40 copies the storage contents of the logical volume 41 which is designated as a primary volume and is the object of storage contents matching between the selected volumes into the logical volume 42 designated as a secondary volume (S15). If the copying is completed, the storage subsystem 40 reports the completion of copying to the host computer 20 via the communication network CN2 (S16). If the host computer 20 receives the copying completion report from the storage subsystem 40, it reports the completion of copying to the management server 10 via the communication network CN1 (S17).

Then, the management server 10 requires the acquisition of storage configuration information present in the storage subsystem 40 via the communication network CN1 (S18). If the storage subsystem 40 transmits the newest storage configuration information to the management server 10 (S19), the management server 10 updates the storage contents of the configuration information DB12 based on the newest storage configuration information (S20).

Figure 6:
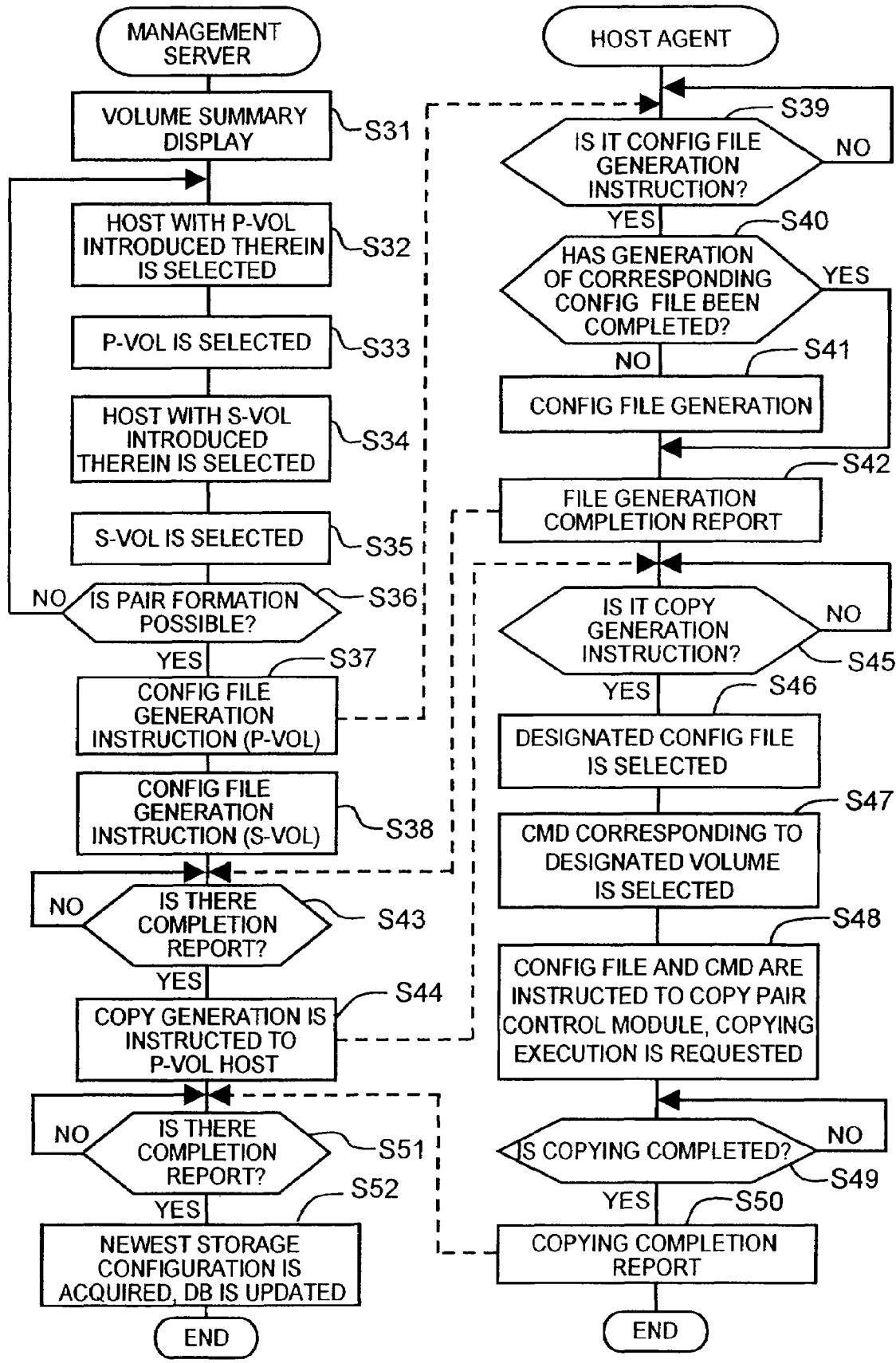
FIG. 6 is flow chart illustrating the operation of the management server and host agent.

The explanation will be further conducted with reference to FIG. 6. The flow chart shown in FIG. 6 shows in greater detail the operation example of the management server 10 and the host agent 21 of the host computer 20 playing the leading role of the outline of the operation in FIG. 4. FIG. 6 shows the state after the transmission of volume information from the host computers 20, 30 to the management server 10 has been completed.

First, the management server 10 displays the volume summary on a screen such as shown in FIG. 5 (S31). Based on the displayed volume summary screen, the storage manager selects the host computer that will set the primary volume (S32), a logical volume connected to this host computer and used as a primary volume (S33), a host computer that will set the secondary volume (S34), and a logical volume connected to this host computer and used as a secondary volume (S35). The volumes selected by the storage manager are then checked as to whether copy pairs can be formed (S36). When copy pairs can be formed (S36: YES), the respective configuration setting file generation instructions are posted via the communication network CN1 to the host computer 20 that will set the primary volume and the host computer 30 that will set the secondary volume (S37, S38).

The processing flow then proceeds to the host agent 21 shown on the right side of FIG. 6. The host agent 21 that has received the configuration setting file generation instruction (S39: YES) decides as to whether the requested configuration setting file has already been generated (S40). When the file has not been generated (S40: NO), the configuration setting file 23 is generated based on the instructed contents (S41). When the configuration setting file has already been generated (S40: YES), step S41 is skipped. The host agent 21 then notifies the management server 10 via the communication network CN1 that the requested configuration setting file 23 has been created (S42).

If the management server 10 receives the generation completion report relating to the configuration setting file from the host agent 21 (S43: YES), it instructs the primary volume copy generation to the host agent 21 via the communication network CN1 (S44).

If the host agent 21 receives the copy generation instruction from the management server 10 (S45: YES), it selects the respective control devices 24 corresponding to the specified configuration setting file 23 and specified volume (S46, S47). In the present embodiment, because one volume is set in each of the host computers 20, 30 for the convenience of explanation, only one control device is shown. The host agent 21 designates the specified configuration setting file 23 and control device 24 and requests to start copying (S48).

As a result, the copy pair control module 22 generates the prescribed command and transmits the generated command to the storage subsystem 40 via the communication network CN2. If the storage subsystem 40 receives the instruction from the copy pair control module 22, copying between the volumes is started in the storage subsystem 40, and once the copying has been completed, the storage subsystem reports the copying completion to the host agent 21 via the communication network CN2.

If the host agent 21 received the copying completion report from the storage subsystem 40 (S49: YES), it reports the copying completion to the management server 10 via the communication network CN1 (S50).

If the management server 10 receives the copying completion report (S51: YES), it requests the acquisition of the newest storage configuration information from the storage subsystem 40 via the communication network CN1, and if the storage configuration information is acquired from the storage subsystem 40, the management server updates the storage contents of the configuration information DB12 (S52). When no response is obtained despite waiting for the prescribed interval in the decision waiting steps shown in the figure (for example, S43, S51), the processing can be ended as a time-out error.

Figure 7:
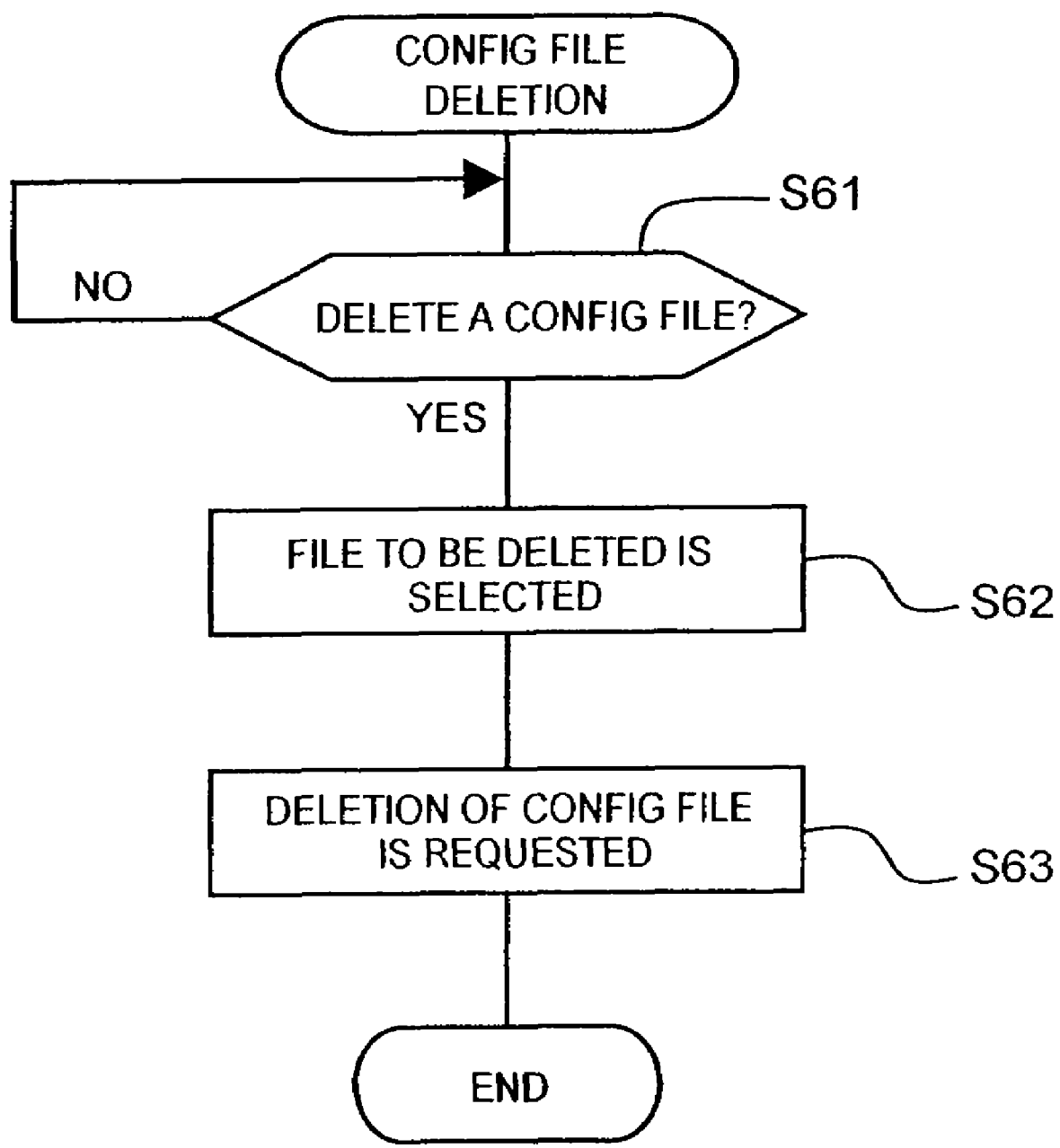
FIG. 7 is a flow chart illustrating the configuration setting file deletion processing.

FIG. 7 illustrates the processing conducted in the case of deleting a configuration setting file that has already been generated. First, a decision is made as to whether the deletion of a configuration setting file has been requested by the storage manager (S61). When the deletion of a configuration setting file has been requested (S61: YES), the file that will be deleted is selected (S62), and a deletion request relating to the configuration setting file is transmitted from the management server 10 to the host agent holding the selected configuration setting file (S63).

As described in detail hereinabove, with the present embodiment, setting a copy pair and copying between the volumes can be executed smoothly by a series of remote operations from the management server 10. Therefore, it is not necessary for the storage manager to conduct operations while communicating with the host managers of host computers 20, 30 by voice, telephone, e-mail, or the like, and the operability can be improved.

Second Embodiment

The second embodiment of the present invention will be explained hereinbelow with reference to FIGS. 8 through 11. The specific feature of the present embodiment is that the notification of the copying start instruction has been optimized.

Figure 8:
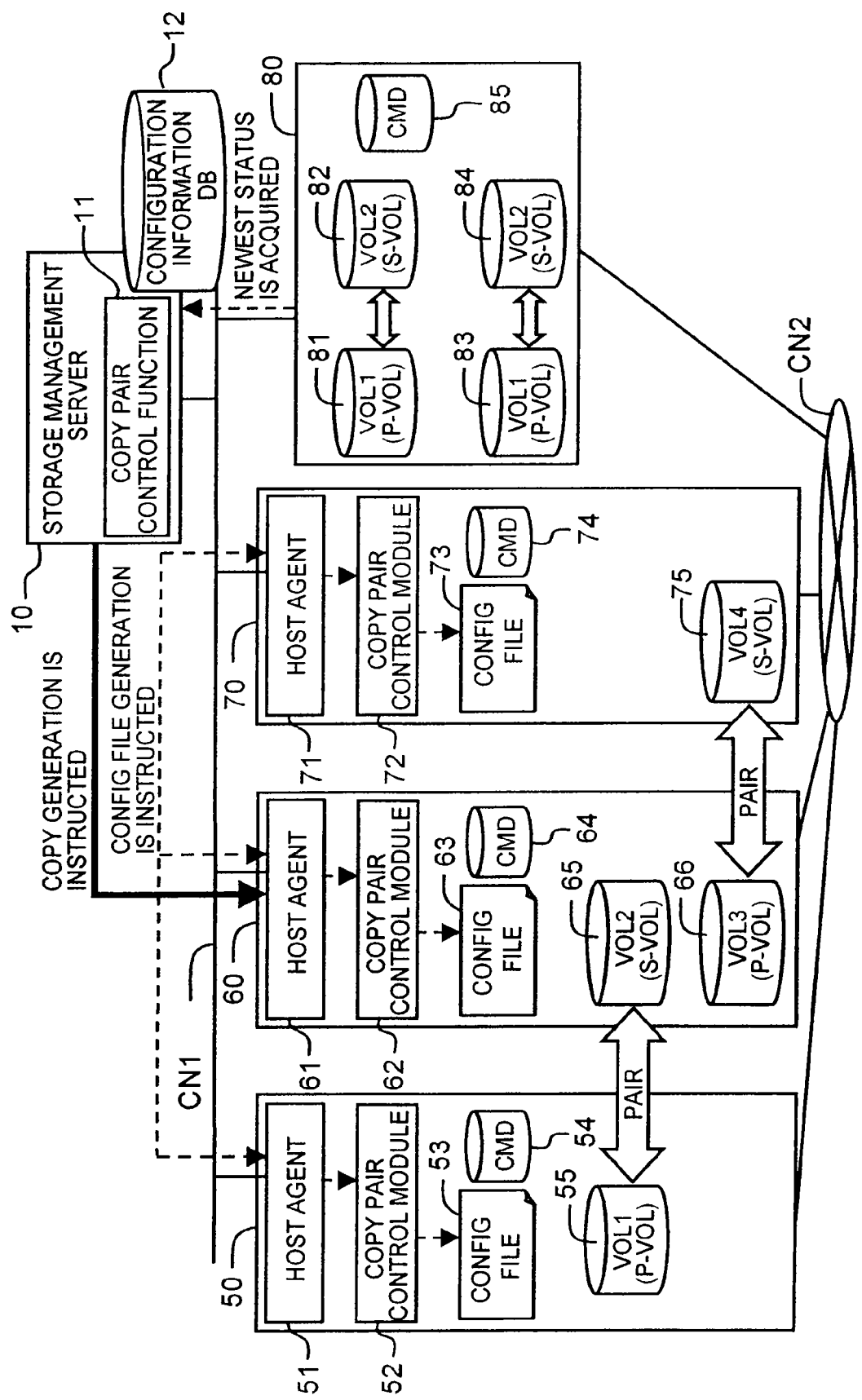
FIG. 8 is a block diagram showing the outline of the entire storage system of the second embodiment of the present invention.

FIG. 8 shows the outline of the entire storage system of the present embodiment. For example, three host computers 50, 60, 70 are provided in the storage subsystem of the present embodiment. The host computers 50, 60, 70 comprise the respective host agents 51, 61, 71, copy pair control modules 52, 62, 72, configuration setting files 53, 63, 73, control devices 54, 64, 74, and volumes. The first host computer 50 comprises a primary volume 55. The second host computer 60 comprises a secondary volume 65 forming a pair with the primary volume 55 of the first host computer 50 and the other primary volume 66. The third host computer 70 has a secondary volume 75 forming a pair with the primary volume 66 of the second host computer 60.

The correspondence relation of the primary volume 55 and secondary volume 65 forming the first pair is recorded in the configuration setting file 53 of the first host computer 50. The correspondence relation of the primary volume 55 and secondary volume 65 forming the first pair and the correspondence relation of the primary volume 66 and secondary volume 75 forming the second pair are recorded in the configuration setting file 63 of the second host computer 60. The correspondence relation of the primary volume 66 and secondary volume 75 forming the second pair is recorded in the configuration setting file 73 of the third host computer 70.

A storage subsystem 80 comprises a total of four volumes 81-84 forming two respective copy pairs and a control device 85. The first pair is configured of a logical volume 81 provided to the first host computer 50 and a logical volume 82 provided to the second host computer 60. The second pair is composed of a logical volume 83 provided to the second host computer 60 and a logical volume 84 provided to the third host computer 70.

Figure 9:
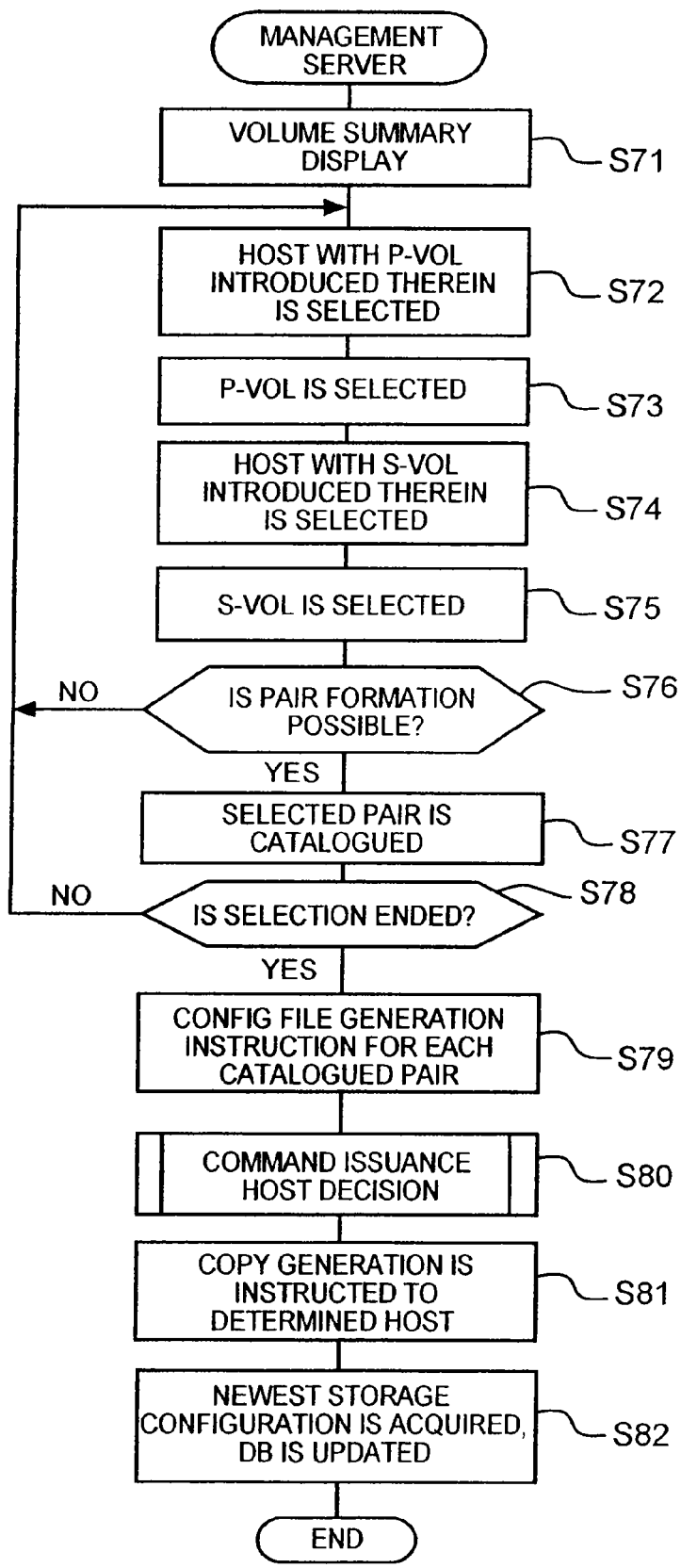
FIG. 9 is a flow chart illustrating the operation of the management server.

FIG. 9 is a flow chart illustrating the main aspects of the operation of the management server 10. First, the management server 10 displays the summary of the volumes constituting a SAN (S71) and induces the storage manager to select the host computer that will set the primary volume (S72), a logical volume that will be selected as a primary volume to the host computer (S73), a host computer that will set the secondary volume (S74), and a logical volume that will be connected as the secondary volume to the host computer (S75).

Then, the management server 10 checks as to whether the selected host computer can form a pair (S76). When the copy pair can be formed (S76: YES), the host computers and logical volumes selected in steps S72-S75 are catalogued as copy pairs in a memory or the like (S77). The above-described processing S72-S77 is repeated till the selection of copy pairs by the storage manager is completed (S78).

If the storage manager selects all the copy pairs (S78: YES), the management server 10 posts a configuration setting file generation instruction via the communication network CN1 to each host computer that will configure the catalogued pairs (S79). The management server 10 then determines a host computer for posting a copy command (S80). This processing will be further described hereinbelow. The management server 10 then posts a copy command via the communication network CN1 to the specific host computer detected in step S80 and instructs the copy start thereto (S81). If the copying between the volumes in the storage subsystem 80 is completed, the management server 10 acquires the newest storage configuration information from the storage subsystem 80 via the communication network CN1 and updates the configuration information DB12 (S82).

Figure 10:
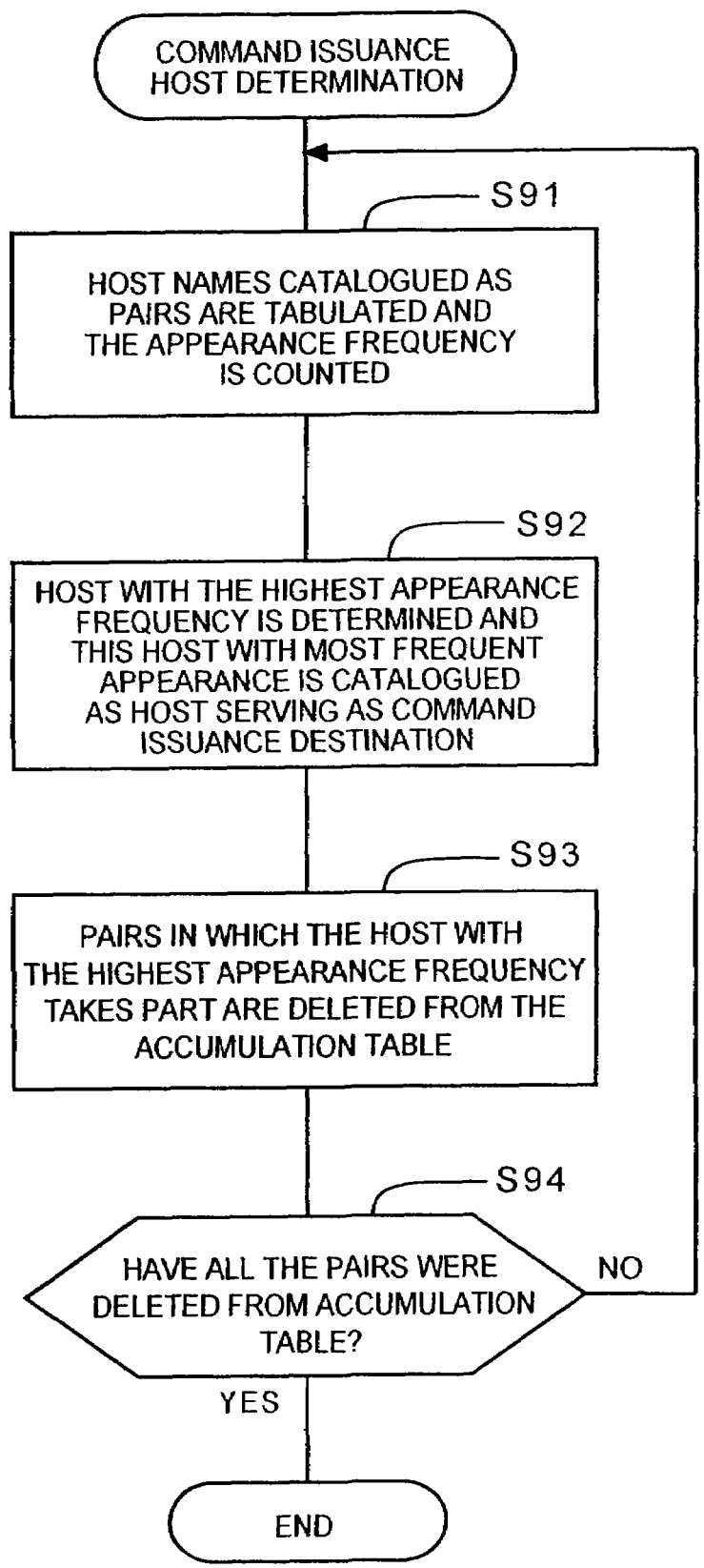
FIG. 10 is a flow chart illustrating the processing for determining the command issuance destination host shown in FIG. 9.

FIG. 10 is a flow chart illustrating the processing for determining the command issuance destination indicated in step S80 illustrated by FIG. 9. FIG. 11 will be also referred to during the explanation. First, the management server 10 tabulates the appearance frequency for each host computer catalogued as a respective copy pair with the accumulation table such as shown in FIG. 11(a) (S91). The contents of pairs for which each host computer was catalogued as a self-host computer and a mate-host computer is shown in the accumulation table.

Then the management server 10 detects the name of the host computer with the highest appearance frequency (FIG. 11(b)) and catalogues this host computer with the highest appearance frequency as a copy command issuance destination host computer (S92). As shown in FIG. 11(c) the appearance frequency of the second host computer 60 "Host2" is four and is the highest appearance frequency. Therefore, as shown in FIG. 11(d), the second host computer 60 is catalogued as a copy command issuance destination host computer.

The management server 10 then deletes from the accumulation table the fields in which the host computer 60 that was catalogued as a copy command issuance destination host computer takes part as either a self-host computer or a mate-host computer (S93). The processing of steps S91-S93 is repeated till all the pairs are removed from the accumulation table (S94). As shown in FIG. 11(e), because the host computer 60 takes part in all the copy pairs, it is equivalent to deleting substantially the entire contents of the accumulation table.

Therefore, the management server 10 can execute two copying operations, that is, copying between the primary volume 55 and secondary volume 65 forming the first pair and between the primary volume 66 and secondary volume 75 forming the second pair by transmitting a copy command only once to the second host computer 60. If we suppose that another copy pair formed by the fourth host computer and fifth host computer is added to the configuration shown in FIG. 8, then respective copy commands are transmitted from the management server 10 to the second host computer and either the fourth host computer or the fifth host computer.

In the embodiment of the above-described configuration, the effect identical to that of the first embodiment can be also obtained. In addition, in the present embodiment, the copy command is transmitted with a minimum frequency, rather than being transmitted to each host computer that will set the primary volume. Therefore, the command issuance frequency can be reduced.

Third Embodiment

FIG. 12 is a block diagram showing the outline of the entire storage system of the third embodiment of the present invention. A specific feature of the present embodiment is the application to the case in which copy pairs are formed by a plurality of storage subsystems.

The storage subsystem of the present embodiment comprises a first storage subsystem 90 and a second storage subsystem 100. The first storage subsystem 90 provides a primary volume 91 to the first host computer 20. The second storage subsystem 100 provides a secondary volume 101 to the second host computer 30. The storage subsystems 90, 100 comprises respective control devices 92, 102. The primary volume 91 of the first storage subsystem 90 and the secondary volume 101 of the second storage subsystem 100 form a copy pair.

A copy command from the host computer 20 is transmitted to the control devices 92, 102 of respective storage subsystems 90, 100. Furthermore, if the copying between the volumes striding over the storage subsystem is completed, the management server 10 acquires the respective newest storage configuration information from the storage subsystems 90, 100.

Fourth Embodiment

Figure 13:
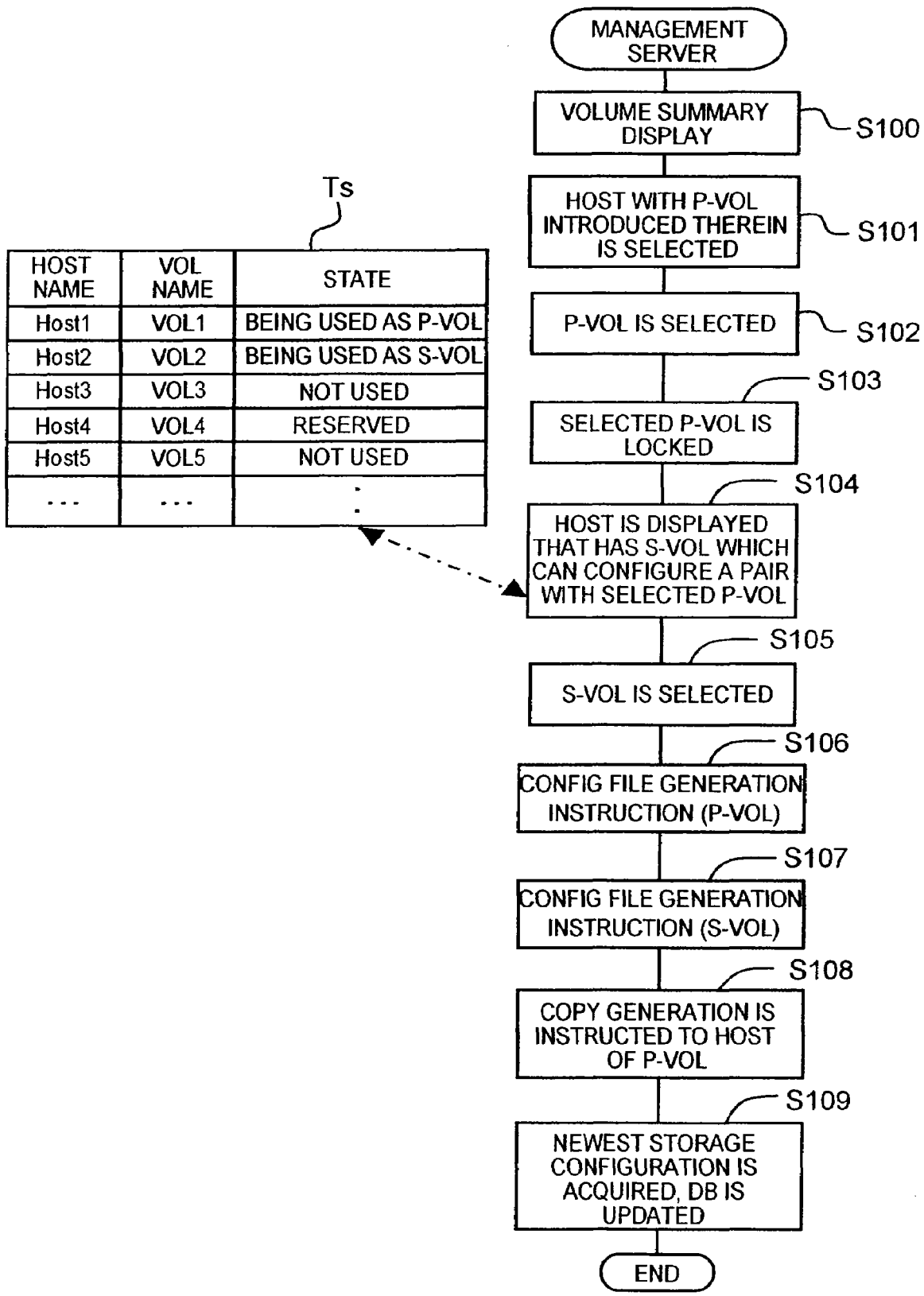
FIG. 13 is a flow chart illustrating the operation of the management server of the fourth embodiment of the present invention.

The fourth embodiment of the present invention will be described below based on FIG. 13. FIG. 13 is a flow chart illustrating the operation of the management server. A specific feature of this embodiment is that the selected volume is protected from external operations and that the storage manager is aided in volume selection.

The management server displays at the UI unit 16 the volume summary used for selecting the copy pair (S100). The storage manager selects the host computer that will set the primary volume (S101) and the logic volume that will be connected as the primary volume to the host computer (S102) based on the displayed volume summary. The management server locks the logical volume selected as the primary volume and blocks the operations from the outside (S103). The management server logically protects the logical volume so that the selected logical volume is not deleted by other operations and is not used for other purposes.

The management server then displays at the UI unit 16 the summary of the host computer having a secondary volume that can form a copy pair with the primary volume selected by the storage manager (S104). The management server can obtain a secondary volume candidate summary table Ts such as shown in the figure, based on the storage contents of the configuration information DB12. Based on this candidate summary table Ts, the management server can present the selectable volume and host computer to the storage manager. Further, it is not particularly necessary to generate the candidate summary table Ts, and the management server can readily establish the selectable secondary volume and the host computer having this secondary volume from the storage contents of the configuration information DB. The selection aid provided by the management server allows the storage manager to select easily the volume and host computer of the mate destination (S105).

Then, in the same manner as described hereinabove, generation instructions of respective configuration setting files are posted to the selected host computers (S106, S107), a copy command is also posted to the host computer having the primary volume (S108), and if copying between the volumes in the storage subsystem is completed, the management server acquires the newest storage configuration information from the storage subsystem and updates the configuration information DB12 (S109).

In the embodiment of the above-described configuration, the effect identical to that of the first embodiment can be also obtained. In addition, in the present embodiment, because the selected logical volume is protected from other operations from the outside, a copy pair can be formed by remote operations from the management server with higher reliability. Furthermore, because the mate volume that can be associated with the selected volume is retrieved and presented to the storage manager, the storage manager can easily select the copy pair.

Fifth Embodiment

Figure 14:
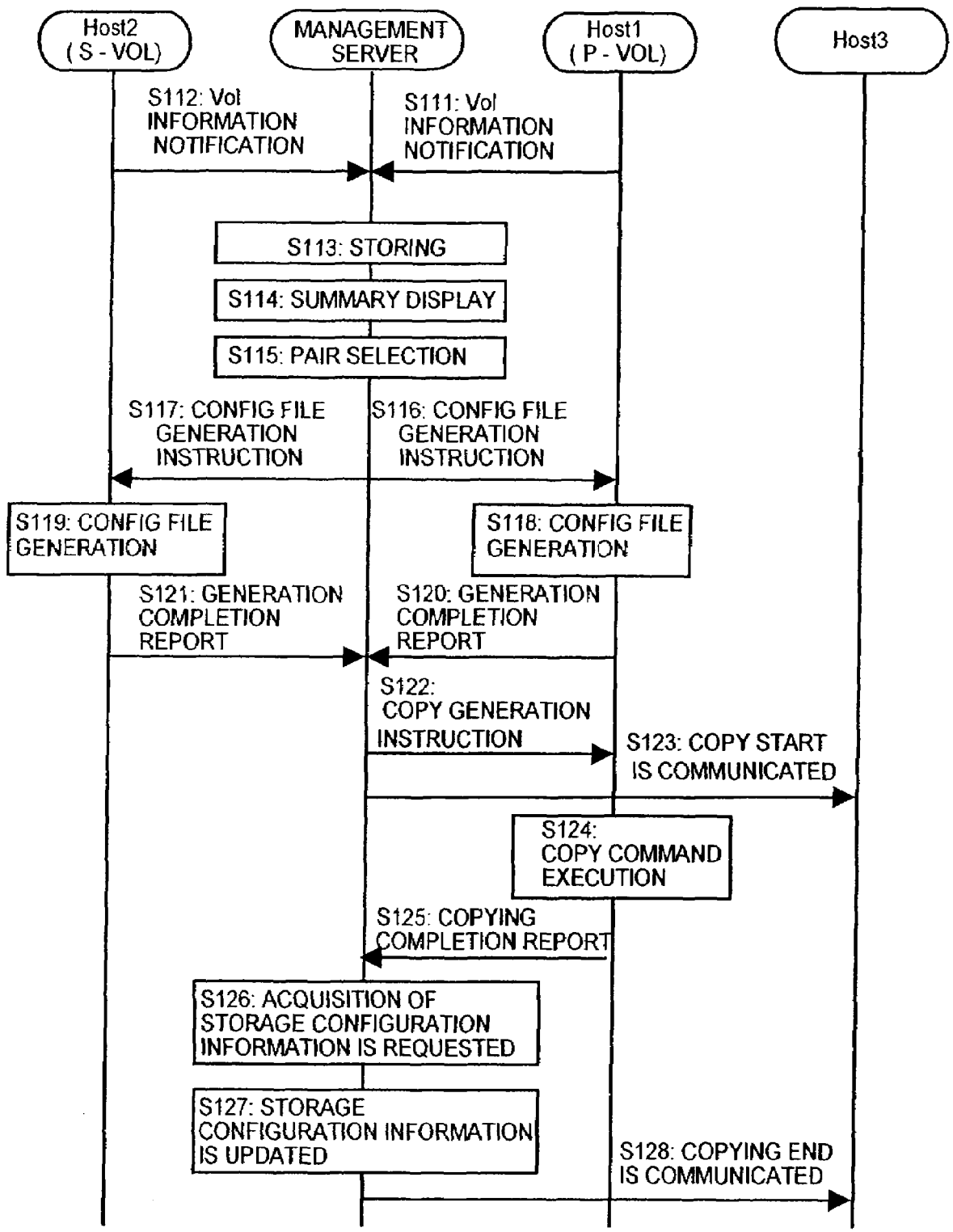
FIG. 14 is a time chart showing the outline of the operation of the entire storage system of the fifth embodiment of the present invention.

FIG. 14 is a time chart showing the outline of the operation of the entire storage system of the fifth embodiment of the present invention. A specific feature of the present embodiment is that the information relating to the execution of copy processing is provided to another host computer which uses a volume that relates to a copy pair but does not participate in forming the copy pair.

In the configuration shown in FIG. 14, a third host computer ("Host3") plays the major role instead of storage subsystem processing. The third host computer refers, when necessary, to the primary volume of the first host computer.

The first and second host computers transmit volume information to the management server (S111, S112). The management server saves the volume information (S113), displays the volume summary (S114), and induces the storage manager to select the host computer for forming a copy pair (S115). If the management server instructs the configuration setting file generation to each selected host computer (S116, S117), the host computers generate the respective configuration setting files based on the instructed contents (S118, S119). Each host computer reports the configuration setting file generation completion to the management server (S120, S121).

The management server transmits a copy command to the host computer that has the primary volume (S122). Further, the management server notifies the third host computer that the copying between the prescribed volumes has started (S123). This notification can contain information specifying the copy source volume, information specifying the host computer having the copy source volume, information specifying the copy destination volume, and information specifying the host computer having the copy destination volume.

The first host computer executes the copy command (S124) and when the copying between the volumes in the storage subsystem is completed, the first host computer reports the copying completion to the management server (S125). The management server acquires the newest storage configuration information from the storage subsystem (S126), and updates the storage contents of the configuration information DB12 (S127). Furthermore, the management server notifies the third host computer to the effect that the copying processing in the prescribed copy pair has been completed (S127).

In the embodiment of the above-described configuration, the effect identical to that of the first embodiment can be also obtained. In addition, in the present embodiment, because the third host computer that is associated with the volume which relates to the copy pair but takes no direct part in the copy pair is notified about the start and end of copying processing, the utility of the storage system is increased.

Sixth Embodiment

Figure 15:
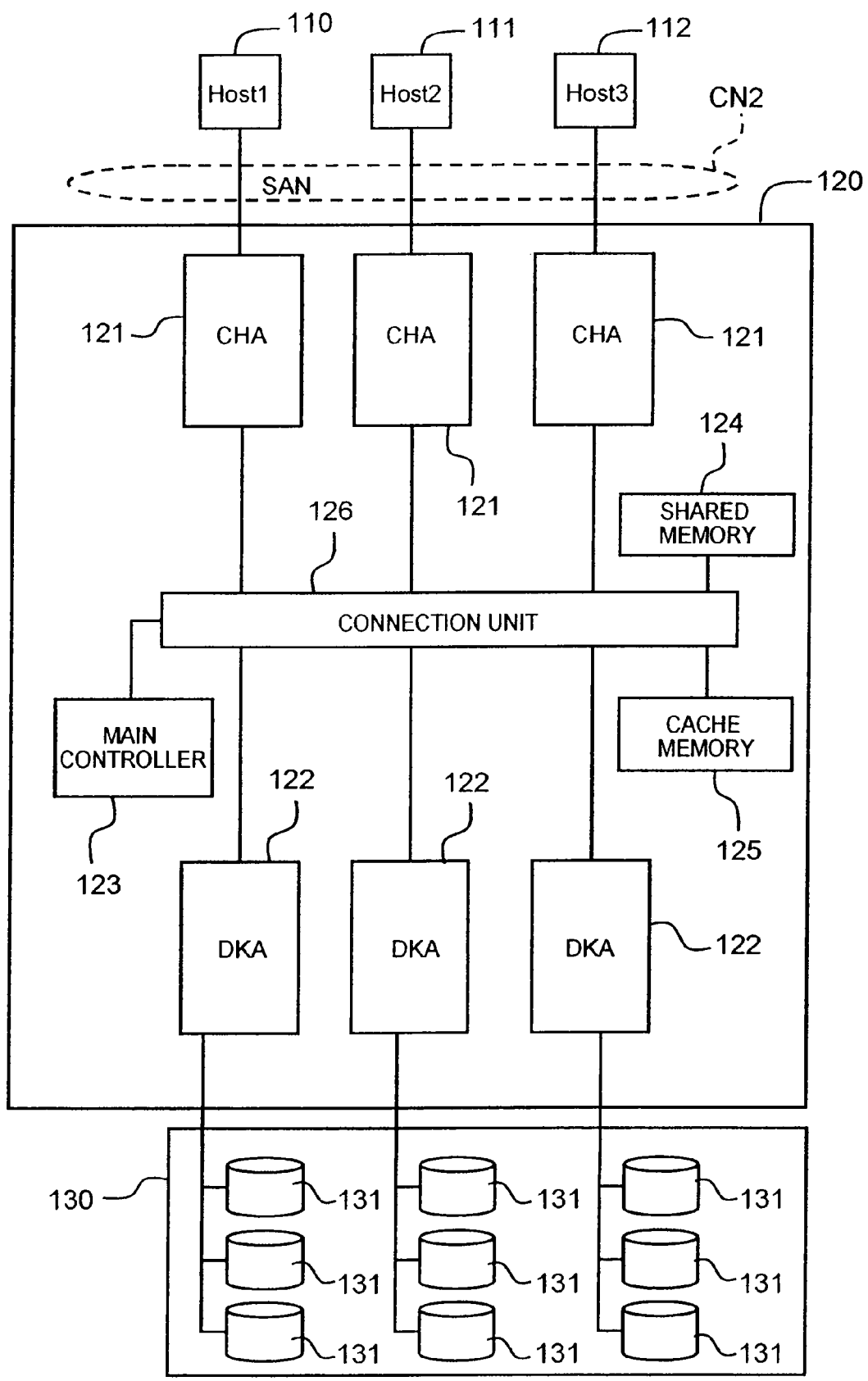
FIG. 15 is a block diagram illustrating an embodiment of the disk array apparatus that relates to the sixth embodiment of the present invention and can be used as a storage subsystem.

FIG. 15 is a block diagram illustrating an embodiment of the disk array device that can be used as a storage subsystem in the first to fifth embodiments.

A controller 120 of the disk array device controls the operation of the storage device 130. The controller 120 is configured, for example, by providing a plurality of channel adapters (CHA) 121, a plurality of disk adapters (DKA) 122, a main controller 123, a shared memory 124, a cache memory 125, and connection units 126 connecting the components 121-125 to each other.

Each channel adapter 121 and each disk adapter 122 are configured as microcomputer systems comprising respective microprocessors and memories. Each channel adapter 121 is connected to a respective host computer 110-112, and can independently process the requests from respective host computers 110-112. The main controller 123 generalizes the operation in the controller 120. Each disk adapter 122 conducts data exchange with the disk 131 of the storage device 130. Commands of various types and control information are stored in the shared memory 124, and the work area can be also set therein. The data which is to be written onto the disk 131 and the data read out from the disk 131 are stored temporarily in the cache memory 125.

The high-functionality disk array device with the above-described configuration can be used as a storage subsystem.

The present invention is not limited to the above-described embodiments. Various modifications and changes that will be apparent to those skilled in the art may be resorted to, without departing from the scope of the invention. In the above-described embodiments, the explanation was focused on the copying between the volumes, but the present invention is not limited thereto and can be also applied to remote operations relating to processing of other types.

What is claimed is:

1. A setting method for storage configuration information, which uses at least one host computer, at least one storage device for providing a memory device to said host computer, and a management computer for managing said storage device, said setting method comprising:

said management computer in advance acquiring configuration information of said memory device that is provided to said host computer, said configuration information storing information relating to where first host computer of a primary volume is located and which of a plurality of volumes of said at least one host computer is configured with the primary volume as a copy pair;

said management computer selecting one or more host computers in which more copy pairs than other host computers are detected based on said acquired configuration information;

said management computer generating change information for changing said acquired storage configuration information and posts the generated change information to said selected host computer, said change information storing information relating to where the entity of the primary volume is located and which of the plurality of volumes of the selected host computer changes the copy pair; and said host computer executing one or more application programs which use data that is stored in said volumes of said selected host computer;

said host computer instructing a change of configuration to said storage device based on said change information posted from said management computer, wherein said management computer generates a configuration setup file in response to change information which identifies a first copy pair and sends said configuration setup file to said at least one selected host computer, wherein said management computer, subsequent to transmitting said configuration setup file, instructs said at least one selected host computer to establish said first copy pair, wherein said at least one selected host computer, after receiving said instructing to establish said first copy pair, instructs said storage device to commence copying data from one of the volumes of said at least one selected host computer identified in said configuration setup file to a secondary logical volume of another host computer identified in said configuration setup file, wherein said management computer, subsequent to receiving a copying-complete report from said at least one selected host computer, requests configuration information from inside said storage device and updates said storage configuration information based on said configuration information received in response to said request.

* * * * *

UNITED STATES PATENT AND TRADEMARK OFFICE
CERTIFICATE OF CORRECTION

PATENT NO. : 7,610,508 B2
APPLICATION NO. : 12/050699
DATED : October 27, 2009
INVENTOR(S) : Ohno et al.

It is certified that error appears in the above-identified patent and that said Letters Patent is hereby corrected as shown below:

Title Page:

In the bibliographic data at Item [75] Inventors,

"Toshihiro Kawano, Ayase (JP)"

should read,

--Toshihiko Kawano, Ayase (JP)--

Signed and Sealed this

Twenty-seventh Day of April, 2010

David J. Kappos
*Director of the United States Patent and Trademark Office*